United States Patent
Donnig et al.

(10) Patent No.: US 11,656,593 B2
(45) Date of Patent: May 23, 2023

(54) ELECTRICAL POWER DISTRIBUTION SYSTEM AND ALLOCATION METHOD FOR DISTRIBUTING ELECTRICAL POWER

(71) Applicant: KID-Systeme GmbH, Buxtehude (DE)

(72) Inventors: Uwe Donnig, Buxtehude (DE); Jens Brey, Buxtehude (DE); Matthias Zachäus, Buxtehude (DE)

(73) Assignee: KID-Systeme GmbH, Buxtehude (DE)

( * ) Notice: Subject to any disclaimer, the term of this patent is extended or adjusted under 35 U.S.C. 154(b) by 0 days.

(21) Appl. No.: 17/319,225

(22) Filed: May 13, 2021

(65) Prior Publication Data

US 2021/0356924 A1    Nov. 18, 2021

(30) Foreign Application Priority Data

May 13, 2020   (DE) .................... 10 2020 206 023.1

(51) Int. Cl.
   *G05B 19/042*   (2006.01)
   *H02J 13/00*    (2006.01)
   *B64D 41/00*    (2006.01)

(52) U.S. Cl.
   CPC ...... *G05B 19/042* (2013.01); *H02J 13/00002* (2020.01); *B64D 41/00* (2013.01); *G05B 2219/2639* (2013.01)

(58) Field of Classification Search
   CPC .......... G05B 19/042; G05B 2219/2639; H02J 13/00002; H02J 1/14; H02J 2310/52;
   (Continued)

(56) References Cited

U.S. PATENT DOCUMENTS

| 5,936,318 A   | 8/1999 | Weiler et al. |
| 9,914,548 B1 * | 3/2018 | Vadillo ............ H02J 7/00 |

(Continued)

FOREIGN PATENT DOCUMENTS

| DE | 196 17 915 A1 | 11/1997 |
| DE | 10 2006 028 823 A1 | 1/2008 |
| EP | 2 514 062 B1 | 11/2017 |

OTHER PUBLICATIONS

British Search Report for Application No. 2105784 dated Oct. 11, 2021.

(Continued)

*Primary Examiner* — Ramesh B Patel
(74) *Attorney, Agent, or Firm* — KDW Firm PLLC

(57) ABSTRACT

An electrical power distribution system has a converter module having a converter to convert AC voltage from AC voltage sources to DC voltage and provide DC voltage power with adjustable maximum power values at electrical output interfaces of the converter module to a maximum module power value. It includes a power profile management device to negotiate individual power profiles with electrical consumers connectable to the electrical output interfaces, according to which individual power profiles electrical power up to a negotiated maximum power value is provided by the converter via the electrical output interface. The device detects instantaneous actual power consumption with which an individually negotiated power profile and calculates a power reserve value of the converter as the difference between negotiated maximum power value and instantaneous actual power consumption and negotiate with consumers whose power reserve value is higher than an adjustable reserve threshold value a new power profile.

14 Claims, 3 Drawing Sheets

(58) Field of Classification Search
CPC ............... H02J 2310/60; H02J 2310/62; H02J 2310/44; H02J 1/00; H02J 4/00; H02J 3/14; B64D 41/00; B64D 11/0624; B64D 11/00; B64D 2221/00; B60L 2200/10; B60L 1/00; B60R 16/03; G06F 1/3206

See application file for complete search history.

(56) References Cited

U.S. PATENT DOCUMENTS

| | | | | |
|---|---|---|---|---|
| 10,822,107 | B1* | 11/2020 | Sheffield | H02J 3/007 |
| 10,831,223 | B2* | 11/2020 | Forbes, Jr. | H02J 13/00028 |
| 11,018,521 | B2* | 5/2021 | Freitag | H02J 4/00 |
| 11,152,807 | B2* | 10/2021 | Camiolo | G06F 1/266 |
| 11,217,994 | B2* | 1/2022 | Yilmaz | H02J 1/14 |
| 11,314,307 | B2* | 4/2022 | Santini | G06F 1/3296 |
| 2002/0175567 | A1* | 11/2002 | Marin-Martinod | H02J 3/14 307/29 |
| 2004/0057177 | A1 | 3/2004 | Glahn et al. | |
| 2007/0296273 | A1 | 12/2007 | Reitmann et al. | |
| 2013/0297089 | A1* | 11/2013 | Fu | G06Q 50/06 700/295 |
| 2015/0045976 | A1* | 2/2015 | Li | B60L 1/006 700/295 |
| 2015/0165917 | A1* | 6/2015 | Robers | B60L 53/14 320/109 |
| 2016/0336745 | A1* | 11/2016 | Pandya | H02J 7/0068 |
| 2020/0026318 | A1* | 1/2020 | Forbes, Jr. | H02J 13/00034 |
| 2021/0356924 | A1* | 11/2021 | Donnig | H02J 1/14 |
| 2021/0379996 | A1* | 12/2021 | Mosebach | G06F 1/266 |

OTHER PUBLICATIONS

German Office Action for Application No. 10 2020 206 023.1 dated Jun. 29, 2022.
German Search Report for Application No. 10 2020 206 023.1 dated Jan. 29, 2021.
Australian Office Action for Application No. 2021202176 dated Apr. 5, 2023.

* cited by examiner

ELECTRICAL POWER DISTRIBUTION SYSTEM AND ALLOCATION METHOD FOR DISTRIBUTING ELECTRICAL POWER

CROSS-REFERENCE TO RELATED APPLICATION

This application claims priority to German Patent Application Serial No. DE 10 2020 206 023.1 filed May 13, 2020, the entire disclosure of which is incorporated by reference herein.

TECHNICAL FIELD

The disclosure herein relates to an electrical power distribution system having dynamically actuatable connection interfaces for various electrical consumers and to an allocation method for distributing electrical power to electrical consumers according to dynamically adjustable power profiles, in particular for application in the civil aerospace sector.

BACKGROUND

Personal electronic devices (PEDs) are ubiquitous nowadays. Normally, these PEDs are carried with the user wherever he travels, even on board aircraft. For the comfort of the passengers, it is desirable to offer the passengers on board an aircraft the option to charge the electrical energy stores of the PEDs during their time on board the aircraft or to keep the PEDs in mains operation. Airlines generally offer charging facilities for PEDs such as laptops, mobile telephones, smartphones, tablet PCs and the like, in which USB ports or mains ports are used for each passenger individually at their respective aircraft seat.

For the local supply of electrical consumers—both fixedly installed and also mobile devices such as PEDs—on board an aircraft, locally installed power distribution systems having power converters are used, to which a plurality of electrical consumers with different power requirements can be connected.

The performance of such a power distribution system is mainly measured at the maximum and at the same time available power. The higher the maximum power, the higher both weight and costs of the power distribution system. In particular in aviation, a balance between performance on the one hand and weight and costs on the other hand is therefore necessary.

For example, power distribution systems for groups of seats in passenger aircraft should be able to supply electrical power to PEDs of all passengers of the group of seats equally, for example for mains operation and/or charging the energy stores of the PEDs. The maximum power consumption in the context of current charging specifications such as USB-PD ("universal serial bus power delivery") is currently up to 100 watts, for example.

Electrical consumers such as PEDs or else electrical devices fixedly installed in the aircraft cabin usually have an electrical power requirement that varies over time. The more electrical consumers are supplied with electrical power at the same time but independently of one another, the more rare it is, statistically speaking, that all of the electrical consumers coincidentally have a maximum power requirement at the same time.

At the same time, however, it should be ensured that each passenger who in a group of seats connects their PED to the power distribution system can be supplied with a minimum electrical power and that devices fixedly installed in the group of seats such as backrest displays, further electronic components such as seat actuators, sensors, lighting, AC voltage outputs or other entertainment equipment can be provided with the power required for operation at any time.

Documents US 2013/0297089 A1, EP 2 514 062 B1, US 2004/0057177 A1, DE 10 2006 028 823 A1, DE 196 17 915 A1 and U.S. Pat. No. 9,914,548 B1 disclose various approaches for the dynamic power supply of electrical consumers that are connected to a power distribution system.

SUMMARY

One of the objects of the disclosure herein is to find improved solutions for the implementation of power distribution systems, in particular on board a passenger aircraft, in which the available maximum power can be utilized more efficiently.

This and other objects are achieved by a power distribution system and by an allocation method for distributing electrical power to electrical consumers disclosed herein.

According to a first aspect of the disclosure herein, a power distribution system comprises at least one converter module having a converter, which is designed or configured to provide electrical DC voltage power with adjustable maximum power values at a plurality of electrical output interfaces of the converter module up to a maximum module power value. The power distribution system also comprises a power profile management device, which is coupled to the converter and which is designed to negotiate individual power profiles with electrical consumers that can be connected to respective ones of the plurality of electrical output interfaces, according to which individual power profiles electrical power up to a negotiated maximum power value is provided to the consumers by the converter via the electrical output interface and which are stored in a power profile memory of the power profile management device. The power profile management device is configured to detect the instantaneous actual power consumption of the connected consumers with which an individually negotiated power profile already exists, to calculate for each individually negotiated power profile a power reserve value of the converter as the difference between the negotiated maximum power value and the instantaneous actual power consumption, and to negotiate with one or more of the electrical consumers whose power reserve value is higher than an adjustable reserve threshold value a new power profile with a maximum power value lower than the negotiated one if the sum of the negotiated maximum power values exceeds the maximum module power value.

According to a second aspect of the disclosure herein, an allocation method for distributing electrical power to electrical consumers, for example to PEDs, connected to a power distribution system in a passenger aircraft comprises the steps of connecting electrical consumers to respective ones of a plurality of electrical output interfaces of a converter module of an electrical power distribution system, the converter module having a converter, and negotiating individual power profiles between a power profile management device and the electrical consumers, according to which power profiles electrical power up to a negotiated maximum power value is provided to the consumers by the converter via the electrical output interface.

The method further comprises the steps of detecting an instantaneous actual power consumption of the connected consumers with which an individually negotiated power profile already exists, comparing the sum of the negotiated maximum power values with a maximum module power value, which corresponds to a maximum electrical DC voltage power that can be provided by the converter module to the plurality of electrical output interfaces, calculating a power reserve value of the converter for each individually negotiated power profile as the difference between the negotiated maximum power value and the instantaneous actual power consumption, and renegotiating power profiles that have a lower maximum power value than the previously negotiated maximum power value between the power profile management device and those electrical consumers whose calculated power reserve value is higher than an adjustable reserve threshold value when the sum of the negotiated maximum power values exceeds the maximum module power value.

According to a third aspect of the disclosure herein, an aircraft, in particular a passenger aircraft, comprises at least one electrical power distribution system according to the first aspect of the disclosure herein. In some embodiments, the aircraft can furthermore have an electrical voltage source, for example an AC voltage source, which feeds voltage, for example AC voltage, to the at least one electrical power distribution system. In a passenger aircraft having a plurality of groups of seats, the power distribution systems can be assigned in each case to one of the groups of seats.

One of the essential ideas of the disclosure herein involves the principle that each electrical consumer connected to the power distribution system can demand its individual power profile, that is to say that there are no system-based power profile limitations extending across all consumers. Furthermore, granular power demand planning can be effected by power profile limits that can be adjusted in a stepped manner. At the same time, however, it is ensured that newly added electrical consumers are also assigned a power profile with a minimum guaranteed power assignment by virtue of individual, already assigned power profiles being reallocated according to determined rules. As a result, a power reserve is also provided for the case where newly negotiated power profiles for newly connected electrical consumers that are to be admitted in principle in sum exceed the maximum value of the power that can be provided by the power distribution system.

A particular advantage of the solution according to the disclosure herein results from the fact that those electrical consumers whose current power demand utilizes the power profile assigned at the beginning the least can be used individually for releasing power reserves without those electrical consumers that also actually utilize their requested power profile being adversely affected in terms of their power consumption.

In addition, the solution according to the disclosure herein takes into account the actual instantaneous power demand or the actual instantaneous power reserve by virtue of evaluating not the negotiated and allocated theoretical power profile parameters but power values measured in real time during the allocation and reallocation of newly added electrical consumers.

Advantageous configurations and refinements will emerge from the further dependent claims and from the description with reference to the figures.

According to some embodiments of the power distribution system, the plurality of electrical output interfaces of the converter module can comprise USB interfaces. In some embodiments, the power profile management device can negotiate the power profiles according to the USB power delivery and/or the USB battery charging specification. The serial bus system USB ("Universal Serial Bus") provides an interface between two electronic devices that is primarily provided for rapid and straightforward data exchange. With various USB versions such as USB 1.0, 1.1, 2.0, 3.0, 3.1, 3.2 and 4.0, a supply of power to connected devices is possible via the USB cable connections. The USB specification in this case also implements a charging port ("dedicated charging port", DCP), with the aid of which USB-capable electronic devices that have a charging controller and a rechargeable battery can draw current for charging the rechargeable battery from an electrical energy source connected to the charging port. Various USB standards such as the "battery charging specification" (USB-BC) or the "power delivery specification" (USB-PD), for instance, govern the maximum permissible currents, charging voltages and arrangements for charging. Advantageously, many PEDs satisfy the USB standard with respect to mains operation and charging options with the result that a power distribution system having such interfaces is particularly well suited for implementing the granular power demand planning by power profile limits that can be adjusted in a stepped manner.

According to some embodiments of the power distribution system, the power profile management device can further be designed to calculate the instantaneous actual power consumption of the connected consumers by determining moving averages of the power consumption of the connected consumers. During charging operation, electrical consumers such as PEDs, for instance, draw electrical charging power from the power distribution system that usually does not vary or varies only a little over time and moreover does not vary suddenly. Determining moving averages (MA), in particular using linear weighted moving averages (LWMA), can make it possible to make a relatively reliable prediction of the current and forecast power reserve amounts. The power distribution system can even be operated temporarily above the maximum power limit with the result that a reliable prediction about the overall power demand advantageously makes it possible to provide an uninterruptible power supply to all of the connected electrical consumers whereas, in the case of anticipated or actually occurring power bottlenecks, the temporarily possible overload operation of the power distribution system can be used to eliminate in a timely manner the power bottlenecks by renegotiating suitable power profiles.

According to some embodiments of the power distribution system, the power profile management device can further be designed to negotiate with one or more of the electrical consumers a new power profile with a higher maximum power value than the negotiated maximum power value if the sum of the negotiated maximum power values undershoots the maximum module power value by a module reserve threshold value. Some connected electrical consumers at the time at which they have demanded a power profile with a determined maximum power value from the power profile management device have been granted only a power profile with a lower maximum power value on account of the currently prevailing power reserve situation at this time.

In some embodiments, the power profile management device can carry out the negotiation of new power profiles with a higher maximum power value than the negotiated maximum power value whenever one of the electrical consumers connected to respective ones of the plurality of electrical output interfaces is unplugged from the output interface. In particular, unplugging electrical consumers releases power reserves again that at later times can contribute to the relaxation of the power reserve situation. The power profile management device can then assign the actually demanded power profile retrospectively to electrical consumers that have initially been granted only a lower power profile than the actually demanded power profile.

According to some further embodiments of the power distribution system, the power distribution system can furthermore have a temperature control device, which can be coupled upstream of the at least one converter module and designed to adjust the maximum module power value of the at least one converter module depending on the temperature of the power distribution system.

According to some embodiments of the allocation method, the plurality of electrical output interfaces of the converter module can be USB interfaces. In this case, in some embodiments of the allocation method, the steps of negotiating power profiles can be effected according to the USB power delivery and/or the USB battery charging specification.

According to some further embodiments of the allocation method, the renegotiation of power profiles with a higher maximum power value than the negotiated maximum power value can be carried out whenever one of the electrical consumers connected to respective ones of the plurality of electrical output interfaces is unplugged from the output interface.

The above configurations and refinements may be combined with one another as desired where expedient. Further possible embodiments, refinements and implementations of the disclosure herein also encompass combinations, which are not explicitly mentioned, of features of the disclosure herein described above or below with regard to the exemplary embodiments. In particular, a person skilled in the art will also add individual aspects as improvements or additions to the respective basic form of the disclosure herein.

BRIEF DESCRIPTION OF THE DRAWINGS

The disclosure herein will be discussed in more detail below on the basis of the example embodiments shown in the schematic figures. In the figures.

Figure 1:
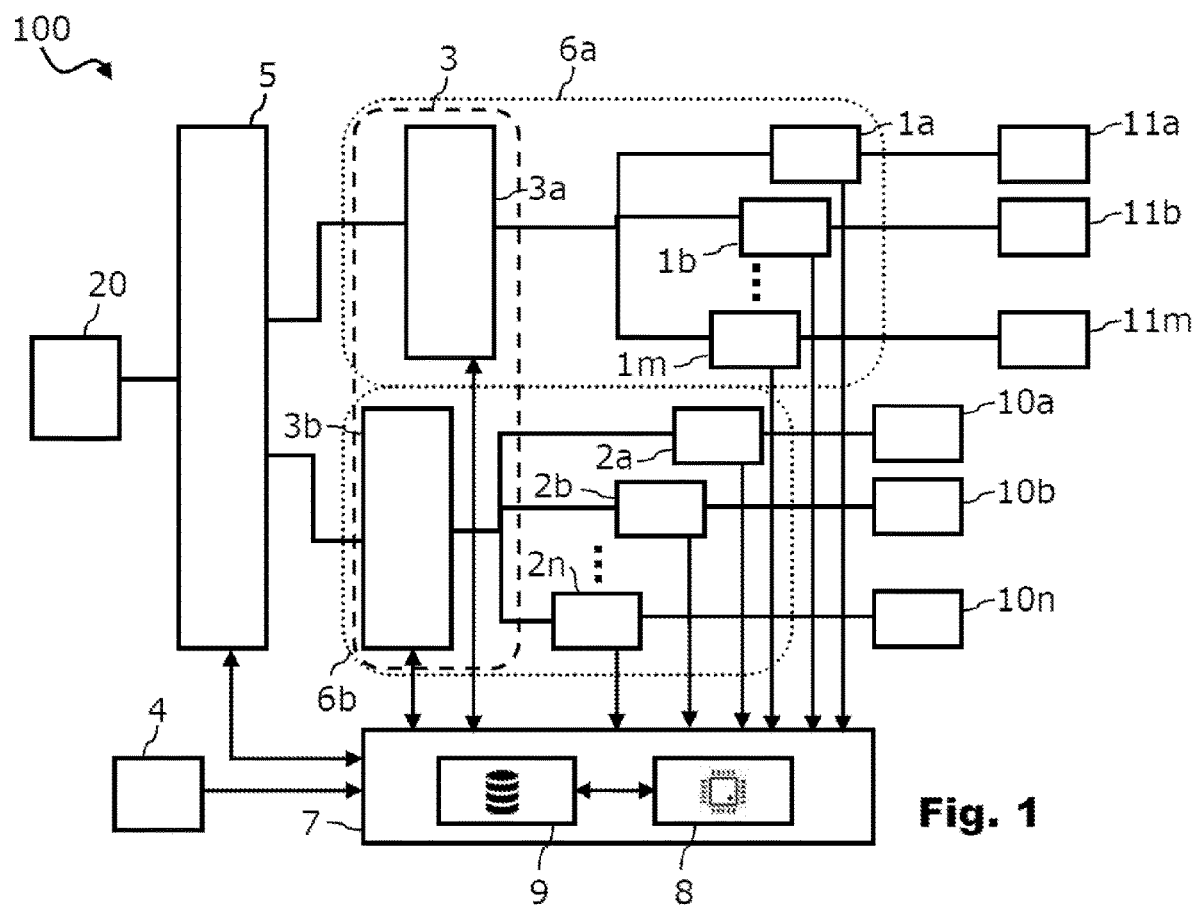
FIG. 1 shows a schematic block diagram of the construction of a power distribution system according to one embodiment of the disclosure herein.

The appended figures are intended to provide improved understanding of the embodiments of the disclosure herein. They illustrate embodiments and serve, in conjunction with the description, for the explanation of principles and concepts of the disclosure herein. Other embodiments, and many of the stated advantages, will emerge with regard to the drawings. The elements of the drawings are not necessarily shown true to scale relative to one another. Direction-indicating terminology such as, for instance, "top", "bottom", "left", "right", "above", "below", "horizontal", "vertical", "front", "rear" and similar indications are used only for explanatory purposes and do not serve to restrict the generality to specific configurations as shown in the figures.

In the figures of the drawing, elements, features and components which are identical, functionally identical and of identical action are denoted in each case by the same reference designations unless stated otherwise.

DETAILED DESCRIPTION

Personal electronic devices (PEDs) in the context of this disclosure herein comprise all electronic devices that can be used for entertainment, communication and/or for office use. For example, PEDs can comprise all types of terminal devices, such as laptops, mobile telephones, smartphones, handheld devices, palmtops, tablet PCs, GPS devices, navigation devices, audio devices such as MP3 players, portable DVD or Blu-ray® players or digital cameras.

Vehicle seats in the context of this disclosure herein comprise any form of structural component of a vehicle that are intended to seat a passenger for the duration of the journey using the vehicle. In particular, vehicle seats in aircraft can be used personally and at least predominantly exclusively by the aircraft passenger of the aircraft during the flight. Seats or vehicle seats in the context of the disclosure herein can be aircraft seats divided into groups of seats, but also loungers, armchairs, beds, suites of first class or business class or similar seating furniture within an aircraft.

Converters in the context of the disclosure herein are all circuits and installations that can be used to convert an infed type of electric current—direct current or alternating current—to the other respectively or to change characteristic parameters such as the voltage and frequency of an infed type of electric current. Converters can comprise rectifiers for the conversion of alternating current to direct current, inverters for the conversion of direct current to alternating current, converter devices for the conversion of one type of alternating current to another or DC voltage converters for the conversion of one type of direct current to another. Converters in the context of the disclosure herein can be implemented with the aid of analogue components such as resistors, inductances and capacitors and/or electronic component parts based on semiconductors, such as diodes, transistors or thyristors, for example.

Figure 3:
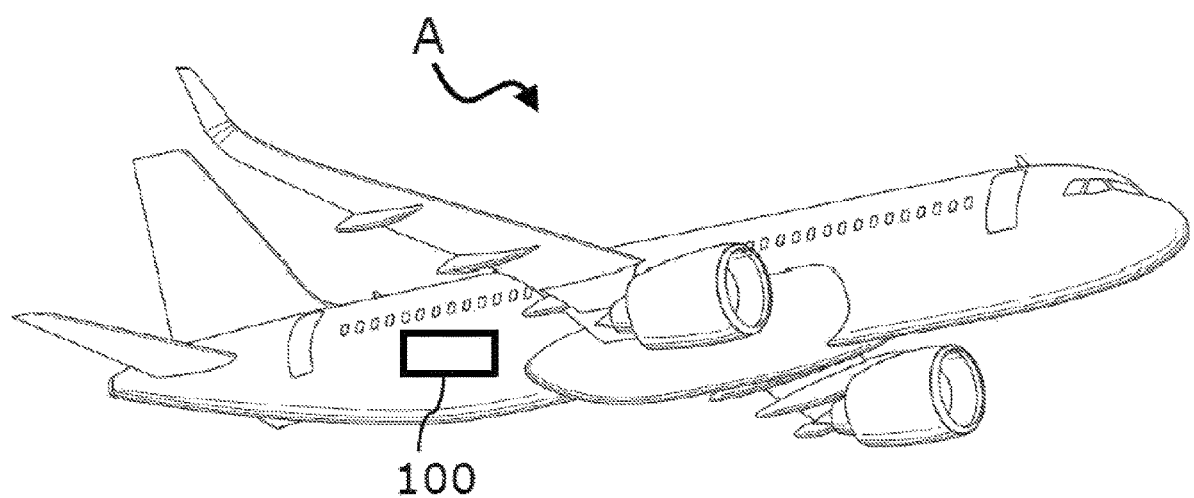
FIG. 3 shows an aircraft having a power distribution system according to a further embodiment of the disclosure herein.

FIG. 1 shows a schematic construction of a power distribution system 100, which can be assigned, for example, to a group of seats in a passenger aircraft, such as the aircraft A illustrated schematically in FIG. 3. Here, each of the different groups of seats in a passenger aircraft can be assigned, for example, a separate power distribution system 100 assembled locally in the aircraft A. Several of the power distribution systems 100 can be fed by one or more voltage sources 20, as illustrated by way of example in FIG. 1.

The voltage sources 20 can have, for example, one or more AC voltage sources 20, such as, for example, generators—in particular engine generators or generators of ram air turbines. Alternatively or in addition thereto, the voltage sources 20 can comprise, for example, DC voltage sources such as photovoltaic installations or fuel cells, for instance. For this purpose, the power distribution system 100 can have an input-side power factor correction circuit 5 (in the case of an AC voltage supply) or an input-side DC voltage converter 5 (in the case of DC voltage supply), which is coupled downstream to one or more converter modules 6a, 6b, of which two are illustrated by way of example in FIG. 1. It should be clear that more or fewer than two converter modules for one power distribution system 100 are likewise possible.

The converter modules 6a, 6b each comprise a converter 3a and 3b, respectively, which each convert a portion of the power provided by the voltage source 20 via the power factor correction circuit or the DC voltage converter 5 to DC voltage power. The converter modules 6a, 6b can be formed as separate circuits or components; however, it may also be possible for the converter modules 6a, 6b to be part of a superordinate converter system and therefore be assigned to the same module. Accordingly, the converters 3a and 3b can also be functional circuit parts of a superordinate converter circuit 3.

The power distribution system 100 can have a temperature control device 4, which can limit the proportion of the overall power to be drawn from the voltage source 20 depending on the boundary conditions in the power distribution system 100, in particular the prevailing temperatures, to a maximum system power. The maximum system power can in this case be that power that the components of the power distribution system 100 can process at the maximum for reasons of the system design or the system safety. The setting of the power distribution system 100 to a maximum system power can in this case be effected by the temperature control device 4 or by the power profile management device 7 described in more detail further below.

The converter module 6a is illustrated in FIG. 1 by way of example as a converter module that supplies a number of electrical consumers 11a to 11m via output interfaces 1a to 1m, the power consumption of the electrical consumers being determined from the outset and the power supply thereof being considered to be essential. For example, these may be displays of an on-board entertainment system on board a passenger aircraft, seat lighting of passenger seats, AC voltage ports, seat actuators or similar consumers. Therefore, the proportion of the overall system power that the converter module 6a converts as a module power value to electrical DC voltage power and outputs to electrical consumers 11a to 11m is substantially constant when all of the electrical consumers 11a to 11m are activated and can assume intermediate levels between zero and the constant module power value when some or all of the electrical consumers 11a to 11m are deactivated.

Electrical consumers 11a to 11m can have either an active or an inactive operating state, that is to say they can either demand their power requirement from the converter module 6a or not. Since the electrical consumers 11a to 11m are essential loads, the power withdrawal of the converter module 6a takes priority over other electrical consumers.

The converter module 6b comprises a converter 3b, which is designed to convert voltage from one or more voltage sources 20 to DC voltage. The converter 3b then outputs electrical DC voltage power with adjustable maximum power values to a plurality of electrical output interfaces 2a to 2n of the converter module 6b. Since the maximum power values at the individual electrical output interfaces can vary, the proportion of the overall system power that the converter module 6b converts to electrical DC voltage power and outputs to one or more electrical consumers 10a to 10n can also vary.

The electrical output interfaces 2a to 2n can be, in particular, USB interfaces, which operate according to the USB power delivery and/or the USB battery charging specification. Electrical consumers 10a to 10n that are connected to the USB interfaces, for example PEDs of passengers of a passenger aircraft, can accordingly negotiate power profiles with the power distribution system 100. The power profiles indicate the maximum power value to which the power distribution system 100 provides power at the respective electrical output interface 2a to 2n.

The converter module 6b and the converter 3b, respectively, are designed to provide electrical power up to a variable maximum module power value. Depending on how many electrical consumers are connected to the electrical output interfaces 2a to 2n and which power profiles have been negotiated or are intended to be negotiated, it may be that the demanded maximum power values in sum exceed the maximum module power value.

To this end, the power distribution system 100 comprises a power profile management device 7, which is coupled to the converter 3b, the electrical output interfaces 2a to 2n and possibly to the temperature control device 4. The power profile management device 7 serves to maintain an overview of the, under some circumstances variable, overall system power value, the maximum module power value of the converter 3b that likewise varies on account of the variability of the overall system power value and the demanded power profiles of electrical consumers at the electrical output interfaces 2a to 2n.

For example, the power profile management device 7 receives from the temperature control device 4 corresponding control signals that limit the overall system power value to an upper system limit value depending on operating conditions detected by the temperature control device 4. Furthermore, the power profile management device 7 detects the instantaneous actual power consumption of electrical consumers 11a to 11m connected to the output interfaces 1a to 1m of the converter module 6a depending on the activation state of the electrical consumers. The sum of the power required by the electrical consumers 11a to 11m forms the module power value of the converter module 6a, which is subtracted from the overall system power value in order to determine the available maximum module power value of the converter module 6b.

The maximum module power value of the converter module 6b can therefore vary dynamically with the overall power available in the power distribution system 100 on the one hand and with the instantaneously required power for the activated essential loads connected to the converter module 6a on the other hand.

The power profile management device 7 has a processor 8, which is provided with software that makes it possible to negotiate individual power profiles with electrical consumers 10a to 10n, for example PEDs of passengers of a passenger aircraft, that can be connected to respective ones of the plurality of electrical output interfaces 2a to 2n, according to which individual power profiles the consumers 10a to 10n are provided with electrical power up to a negotiated maximum power value by the converter 3b via the accordingly assigned electrical output interface 2a to 2n. The processor 8 can store the negotiated power profiles in a power profile memory 9 of the power profile management device 7, which memory is coupled to the processor 8.

The power profile management device 7 is designed to detect the instantaneous actual power consumption of the connected consumers 10a to 10n at the electrical output interfaces 2a to 2n. The detected actual power consumption can then be compared with the corresponding individually negotiated power profiles. The comparison by the processor 8 of the power profile management device 7 forms the difference between the negotiated maximum power value and the measured or detected instantaneous actual power consumption, in each case for each negotiated power profile individually. This results in power reserve values of the converter 3b, which provide information about which of the connected electrical consumers 10a to 10n in fact require less power than is actually granted to them in theory by the negotiated maximum power value.

If additional electrical consumers are connected to the electrical output interfaces 2a to 2n, it may be that a maximum power value to be renegotiated increases the sum of all negotiated maximum power values to an amount that exceeds the maximum module power value. Equally, it may be that the maximum module power value falls below the sum of all of the currently negotiated maximum power values on account of an externally induced reduction in the maximum module power value, for example on account of control signals of the temperature control device 4 or on account of the activation of previously inactive essential loads at the converter module 6a. Conventionally, an electrical consumer would be prevented from demanding power from the converter 6b under these circumstances for reasons of exceeding reserves.

By determining the power reserve values of the converter 3b, the power profile management device 7 is able to identify those electrical consumers with which a new power profile, which has a lower maximum power value than the originally negotiated maximum power value, can be negotiated. In this case, the power profile management device 7 can compare the power reserve values with an adjustable reserve threshold value in order to determine those electrical consumers with which renegotiation of power profiles is possible without the operation or the charging process being significantly impaired. In this case, it may be advantageous for the renegotiated maximum power value to still be above the actual instantaneous power consumption. If the electrical consumer does not accept such a power profile, it can always be an option to assign a power profile with a minimal maximum power value. Such power profiles are to be accepted on an obligatory basis, for example in the USB-PD specification or the USB-BC specification for all compatible devices.

The power profile management device 7 can in this case remove from the renegotiation those connected consumers 10a to 10n that in principle have sufficiently high power reserve values but are connected to electrical output interfaces 2a to 2n that are ranked in a higher supply priority level. For example, it may be possible for users to be able to secure an output interface with a higher supply priority level by paying additional fees or on account of their status as a passenger of business class or as a frequent flyer. The PEDs of such users are therefore always granted a demanded power profile with the desired maximum power value via the output interface with a higher supply priority level, even if the actual power consumption by the connected PED under certain circumstances would produce a power reserve.

The power profile management device 7 can determine the instantaneous actual power consumption of the connected consumers 10a to 10n by suitable averaging and equalizing measurement or detection methods, for example with the aid of determining moving averages in a dynamically tracking time window with an adjustable length in the past. To this end, for example a linear weighted moving average (LMWA) can be used in order to be able to disregard peaks or drops in the power consumption of the connected consumers 10a to 10n that arise temporarily and transiently.

Conversely, it may be possible for power reserves to be released again due to a reduction in the number of connected electrical consumers, for example by a user unplugging a PED from a connection interface. Alternatively or in addition thereto, it may be that the maximum module power value increases above the sum of all of the currently negotiated maximum power values again on account of an externally induced increase in the maximum module power value, for example on account of control signals of the temperature control device 4 or on account of the deactivation of previously active essential loads at the converter module 6a. The power reserves can then be distributed again to other remaining electrical consumers by the power profile management device 7. Preferably, that may be those electrical consumers that have been granted an instantaneously negotiated maximum power value that is below the originally required maximum power value or that has been renegotiated in the course of a power shortage. The power profile management device 7 can for this purpose compare the sum of the negotiated maximum power values of currently connected or remaining electrical consumers with the maximum module power value of the converter module 6b periodically or whenever one of the electrical consumers 10a to 10n connected to respective ones of the plurality of electrical output interfaces 2a to 2n is unplugged from the respective output interface. When the power reserve determined in this way exceeds an adjustable module reserve value, power profiles can be implemented using selected electrical consumers to increase the maximum power values.

Figure 2:
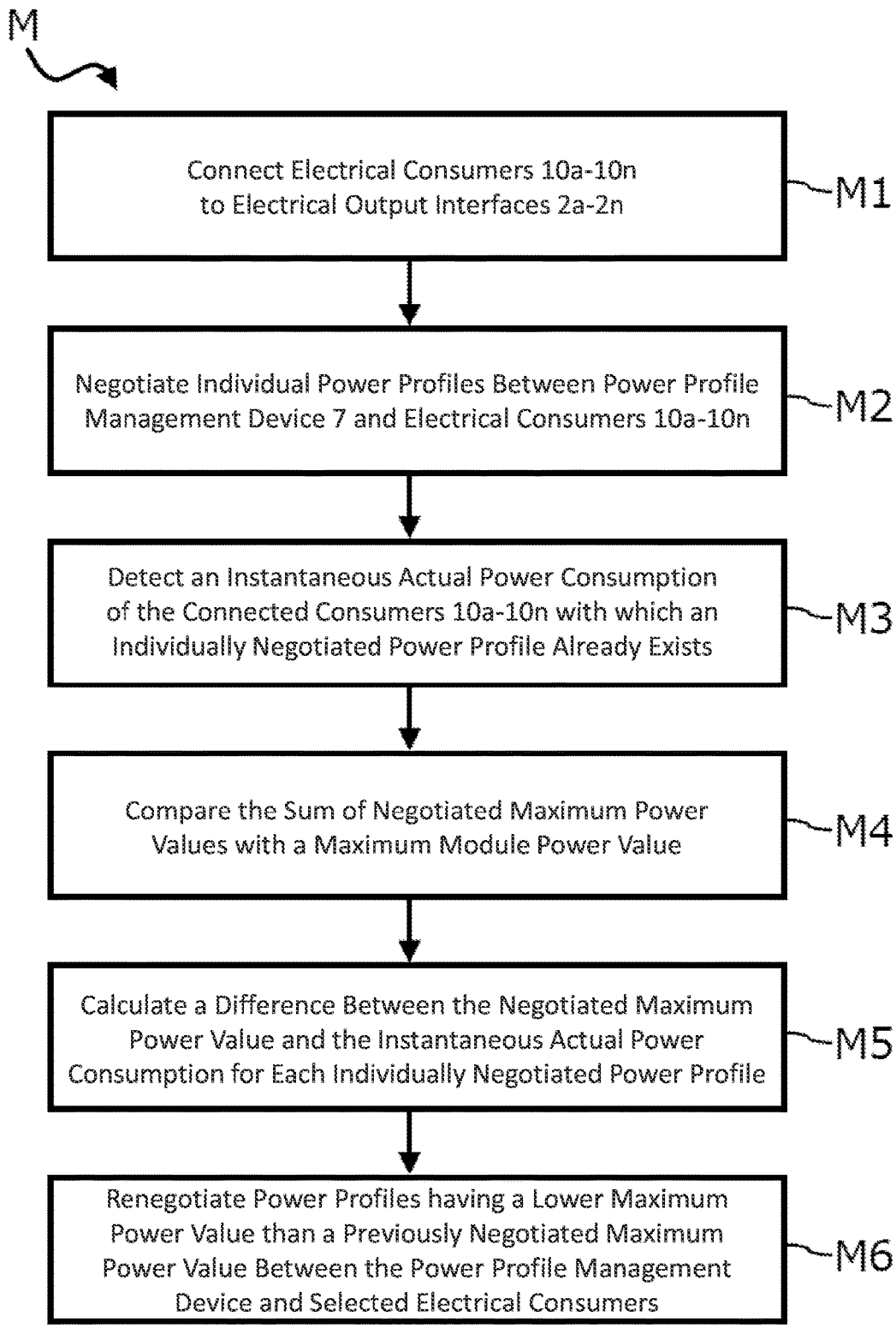
FIG. 2 shows a flowchart of an allocation method for distributing electrical power to electrical consumers, for example using a power distribution system shown in FIG. 1, according to a further embodiment of the disclosure herein.

FIG. 2 shows a flowchart of the method steps of an allocation method M for distributing electrical power to electrical consumers, for example electrical consumers 10a to 10n, which have been connected in a first step M1 to respective ones of a plurality of electrical output interfaces 2a to 2n—for example USB interfaces, which operate according to the USB-PD specification or the USB-BC specification—of a converter module 6b of an electrical power distribution system 100, the converter module having a converter 3b. The method M can be carried out, in particular, in an electrical power distribution system 100 as explained in connection with FIG. 1.

In a following step M2, individual power profiles can be negotiated between a power profile management device 7 and the electrical consumers 10a to 10n, according to which power profiles electrical power up to a negotiated maximum power value is provided to the consumers 10a to 10n by the converter 3b via the electrical output interface 2a to 2n. In a third step M3, an instantaneous actual power consumption of the connected consumers 10a to 10n with which an individually negotiated power profile already exists is detected, for example by determining moving averages of the measured power consumption over time. The sum of the negotiated maximum power values is compared in a fourth step M4 with a maximum module power value, which corresponds to a maximum electrical DC voltage power that can be provided by the converter 3b of the converter module 6b to the plurality of electrical output interfaces 2a to 2n.

A difference between the negotiated maximum power value and the instantaneous actual power consumption can be calculated in a fifth step M5 as the power reserve value of the converter 3b for each individually negotiated power profile with the result that, in a sixth step, power profiles that have a lower maximum power value than the previously negotiated maximum power value can be renegotiated between the power profile management device 7 and those electrical consumers whose calculated power reserve value is higher than an adjustable reserve threshold value whenever the sum of the negotiated maximum power values exceeds the maximum module power value. Conversely, a renegotiation in step M6 of power profiles with a higher maximum power value than the negotiated maximum power value can be carried out whenever one of the electrical consumers 10a to 10n connected to respective ones of the plurality of electrical output interfaces 2a to 2n is unplugged from the output interface.

In order to improve the stringency of the representation, various features were combined in one or more examples in the detailed description above. However, it should be clear in this case that the description above is only of an illustrative and in no way restrictive nature. It is used to cover all alternatives, modifications and equivalents of the various features and exemplary embodiments. Many other examples will be immediately and directly clear to a person skilled in the art on the basis of his technical knowledge in view of the description above.

The example embodiments were chosen and described in order to be able to represent the principles on which the disclosure herein is based and their possible uses in practice in the best possible manner. As a result, experts can optimally modify and use the disclosure herein and its various exemplary embodiments for the intended purpose. In the claims and the description, the terms "containing" and "having" are used as neutral concepts for the corresponding term "comprising". Furthermore, a use of the terms "a", "an" and "one" is not intended to fundamentally exclude a plurality of features and components described in such a way.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical power distribution system comprising:
   at least one converter comprising:
     a plurality of electrical output interfaces, which are configured for connection with electrical consumers; and
     wherein the at least one converter is configured to provide electrical power at the plurality of electrical output interfaces up to a maximum module power value; and
     wherein the electrical power is a direct current (DC) power; and
     wherein the converter is configured such that the electrical power provided to the electrical consumers has a maximum power value that is adjustable;
   a power profile manager coupled to the converter, wherein the power profile manager is configured to negotiate individual power profiles with each of the electrical consumers connected to the plurality of electrical output interfaces;
   wherein, using the individual power profiles negotiated by the power profile manager for each of the electrical consumers, the at least one converter is configured to provide the electrical power to the electrical consumers via a corresponding one of the electrical output interfaces, the electrical power being provided from the at least one converter at a level that is not more than a negotiated maximum power value; and
   wherein the power profile manager is configured to:
     store the individual power profiles negotiated with each of the electrical consumers in a power profile memory of the power profile manager;
     detect instantaneous actual power consumption of the electrical consumers that are connected to the at least one converter and with which one of the individual power profiles negotiated by the power profile manager already exists;
     calculate, for each of the individual power profiles negotiated by the power profile manager, a power reserve value of the converter as a difference between the negotiated maximum power value and the instantaneous actual power consumption detected;
     when one or more electrical consumers of the electrical consumers has a power reserve value that is higher than an adjustable reserve threshold value of the converter and when a sum of the negotiated maximum power value for each of the electrical consumers exceeds the maximum module power value, negotiate a new power profile with the one or more electrical consumers, wherein the new power profile for the one or more electrical consumers has a maximum power value that is lower than the negotiated maximum power value.

2. The power distribution system according to claim 1, wherein the plurality of electrical output interfaces comprise USB interfaces.

3. The power distribution system according to claim 2, wherein the power profile manager is configured such that the power profiles are negotiated according to a USB power delivery specification and/or a USB battery charging specification.

4. The power distribution system according to claim 1, wherein the power profile manager is configured to detect the instantaneous actual power consumption of the electrical consumers by determining moving averages of a power consumption of the electrical consumers.

5. The power distribution system according to claim 1, wherein, when the sum of the negotiated maximum power value for each of the electrical consumers is less than the maximum module power value by a module reserve threshold value, the power profile manager is configured to negotiate a new power profile with one or more electrical consumers of the electrical consumers, wherein the new power profile has a higher maximum power value than the negotiated maximum power value.

6. The power distribution system according to claim 5, wherein the power profile manager is configured to negotiate the new power profile with the one or more electrical consumers whenever one of the electrical consumers is unplugged from a corresponding one of the plurality of electrical output interfaces.

7. The power distribution system according to claim 1, comprising a temperature controller, which is coupled upstream of the at least one converter and is configured to adjust the maximum module power value of the at least one converter depending on a temperature of the power distribution system.

8. An aircraft comprising at least one electrical power distribution system according to claim 1.

9. A passenger aircraft comprising groups of seats and, for each of the groups of seats an electrical power distribution system according to claim 1.

10. An allocation method for distributing electrical power to electrical consumers, comprising:

providing an electrical power distribution system comprising:
  at least one converter comprising a plurality of electrical output interfaces; and
  a power profile manager coupled to the converter;
connecting electrical consumers to respective ones of the plurality of electrical output interfaces;
negotiating, using the power profile manager, individual power profiles with each of the electrical consumers;
providing, from the at least one converter and using on the individual power profiles negotiated by the power profile manager for each of the electrical consumers, electrical power to the electrical consumers via the plurality of electrical output interfaces, the electrical power being provided from the at least one converter at a level that is not more than a negotiated maximum power value;
storing the individual power profiles negotiated with each of the electrical consumers in a power profile memory of the power profile manager;
detecting, using the power profile manager, an instantaneous actual power consumption of the electrical consumers that are connected to the at least one converter and with which one of the individual power profiles negotiated by the power profile manager already exists;
comparing, using the power profile manager, a sum of the negotiated maximum power values with a maximum module power value, which is a maximum electrical power that the converter is capable of providing to the plurality of electrical output interfaces;
calculating, using the power profile manager and for each of the individual power profiles negotiated by the power profile manager, a power reserve value of the converter as a difference between the negotiated maximum power value and the instantaneous actual power consumption detected; and
when one or more electrical consumers of the electrical consumers has a power reserve value that is higher than an adjustable reserve threshold value of the converter and when the sum of the negotiated maximum power values for each of the electrical consumers exceeds a maximum module power value of the at least one converter, negotiating, using the power profile manager, a new power profile with the one or more electrical consumers, wherein the new power profile for the one or more electrical consumers has a maximum power value that is lower than the negotiated maximum power value;
wherein the electrical power provided by the at least one converter to the electrical consumers is a direct current (DC) power; and
wherein the converter has a maximum power value for the electrical power provided to the electrical consumers that is adjustable.

11. The allocation method according to claim 10, wherein the plurality of electrical output interfaces comprise USB interfaces.

12. The allocation method according to claim 11, wherein the individual power profiles are negotiated according to a USB power delivery specification and/or a USB battery charging specification.

13. The allocation method according to claim 10, wherein the power profile manager negotiates the new power profile with the one or more electrical consumers whenever one of the electrical consumers is unplugged from a corresponding one of the plurality of electrical output interfaces.

14. The aircraft according to claim 8, comprising at least one electrical voltage source, which is configured to provide voltage to the at least one electrical power distribution system.

* * * * *